June 29, 1954   H. A. LORD   2,682,057
HEART VALVE
Filed July 24, 1951   2 Sheets-Sheet 1

INVENTOR.
HARRY A. LORD
BY Popper and Bruns
Joshua R. H. Potts
ATTORNEYS.

June 29, 1954  H. A. LORD  2,682,057
HEART VALVE

Filed July 24, 1951  2 Sheets-Sheet 2

INVENTOR.
HARRY A. LORD
BY
ATTORNEYS

Patented June 29, 1954

2,682,057

UNITED STATES PATENT OFFICE 2,682,057

HEART VALVE

Harry A. Lord, Pottstown, Pa.

Application July 24, 1951, Serial No. 238,261

10 Claims. (Cl. 3—1)

The present invention relates to a valve that is intended to be inserted in the human heart and is primarily concerned with a valve structure that is peculiarly adapted for use either as a mitral valve or an aortic valve.

In the copending application of Harry A. Lord, Serial Number 152,033, filed March 27, 1950, for "Artificial Mitral Valve," now abandoned, there is disclosed a valve that is intended for insertion into the human heart as the mitral valve thereof, and the valve of this invention is of this same general type although it is adapted to function not only as a mitral valve, but is also adapted to be included in the human heart where the aorta artery communicates therewith.

Blood enters the auricle of the heart from the pulmonary vein. From the right auricle it passes under the influence of gravity action or what pressure might be left in the pulmonary vein through the mitral valve into the right ventricle. From the right ventricle the blood is forced, by the pumping action of the heart, into the aorta artery. The valve of this invention is intended to be located at either the joinder of the aorta artery to the right ventricle, or in the partition between the right auricle and right ventricle where the mitral valve is located.

An important object of the present invention is the provision of a valve which is made from an appropriate synthetic plastic which does not react chemically with the human blood and which is not affected thereby. The valve consists essentially of a casing including appropriate means for securing the same in position in the heart and from which casing extend inwardly a plurality of webs which converge from the casing wall to a vertex. These webs define, what is in effect, a channel or passage having inclined walls. The wider end or mouth of the channel is disposed in the direction from which the blood comes, while the vertex is at the end through which the blood emerges.

Pressure of the blood caused either by gravity action, or what pressure remains in the pulmonary vein, or the pumping action of the heart causes the webs to spread or expand and thereby open their lines of joinder which radiate from the vertex, while any tendency of the blood to return from the direction from which is it is intended to flow, will cause the webs to close. Thus, the valve is constituted, essentially, as a one-way valve.

Another highly important object of the invention is to provide, in a heart valve of the character indicated, means for securing the valve in position in the human heart. The particular securing means is susceptible of some variation and takes one form when the valve is used as a mitral valve and another form when the valve is included as an aortic valve.

Various other more detailed objects and advantages of the invention such as arise in connection with carrying out the above noted ideas in a practical embodiment, will in part become apparent, and in part be hereinafter stated as the description of the invention proceeds.

The invention, therefore, comprises a valve intended to be inserted in the human heart and which valve consists essentially of a valve casing having means for securing the same in position and formed with a plurality of radially converging webs which meet along their top edges on radial lines which converge at a vertex.

For a full and more complete understanding of the invention, reference may be had to the following description and accompanying drawings wherein.

The aortic valve

Figure 1:
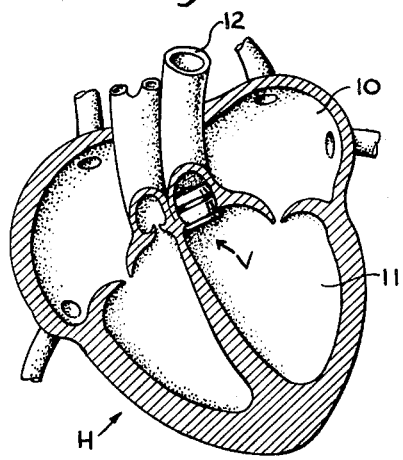
Figure 1 is a view somewhat diagrammatic taken as a section through a human heart and illustrating the positioning of the valve of this invention therein.

Referring now to the drawing wherein like reference characters denote corresponding parts and first more particularly to Figure 1, a human heart is therein depicted and identified in its entirety by the reference character H. The heart H is shown as including a right auricle 10, a right ventricle 11, and an aorta artery 12 which communicates with the right ventricle 11.

It will be understood that the pumping action of the heart is intended to force blood from the right ventricle into the aorta artery 12 with that degree of pressure which is necessary to cause circulation. The valve of this invention, when adapted for use as an aortic valve, is referred to in its entirety by the reference character V and is shown as being located where the aorta artery 12 communicates with the right ventricle 11.

Referring now more particularly to Figures 2 to 6, inclusive, the valve V which is therein illustrated may be made from any appropriate material having the required properties of flexibility, resiliency, and elasticity. The invention has particularly in mind the use of certain synthetic plastics having such properties and which do not react chemically with blood nor are they affected thereby. Such plastics are now well known and available to the public as such. Among the plastics which have been found suitable for this purpose are polyethelene, nylon, and the like.

Figure 4:
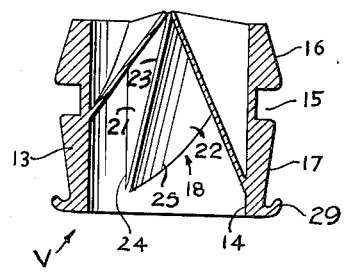
Figure 4 is a vertical section through the valve in closed position.

The valve V includes as an essential element a valve casing 13. This casing has an internal bore 14 as illustrated in Figure 4 and its outer surface is formed with an annular groove 15. The major part of the casing 13 is received in the aorta artery and when so received the wall of the artery is sutured to the casing at the groove 15. From the groove 15 the casing 14 has an outer tapered or truncated conical surface 16 with the smaller end of the latter disposed toward the aorta artery. Likewise, there is another tapered or truncated conical surface 17 with the smaller end of the latter disposed toward the right ventricle of the heart.

Figure 6:
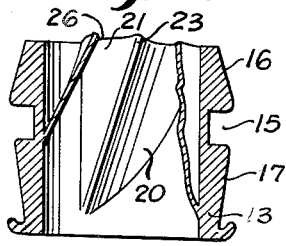
Figure 6 is a vertical section through the valve in open position.

Extending inwardly from the bore 14 of the casing wall 13 are three webs 18, 19 and 20. These webs are all substantially alike and the construction of one of them is more clearly depicted in Figures 4 and 6. In this view the web 18 is shown as comprising two walls 21 and 22 which are integrally joined along a fold or crease 23. The wall 21 is integrally joined to the casing wall 13 along a line 24 which is substantially straight and parallel to the axis of the valve casing. The wall 22 is integrally joined to the casing wall 13 along a curved line 25.

The detailed construction given above for the web 18 is repeated in each of the webs 19 and 20. The wall 21 of the web 18 has a top edge at 26 and the wall 22 has a top edge 27. The top edge 26 abuts the top edge 27 of the web 20 in sealing engagement when the valve is in closed position. Likewise the top edge 26 of the wall 21 of the web 20 engages the edge 27 of the wall 22 of the web 19. This same relation is also repeated between the edge 26 of the wall 21 of the web 19 and edge 27 of the wall 22 of the web 18.

Figure 2:
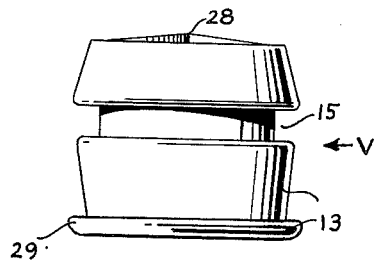
Figure 2 is a view in side elevation of the valve per se.

As is clearly brought out in Figure 2 the top edges of the web are slightly inclined and meet at a vertex 28 which is slightly raised as compared to the upper end of the casing wall 13. Likewise, the meeting lines are defined by these top edges converge upwardly and join at the vertex 28.

A flange 29 is formed on the lower end of the casing 13 this flange engages the web or membrane of the heart as shown in Figure 1 and aids in securing the valve in position.

Figure 3:
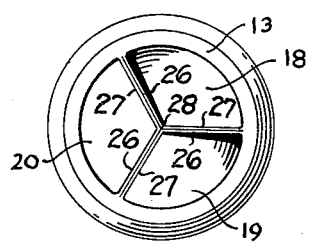
Figure 3 is a top plan view of the valve in closed position.
Figure 5:
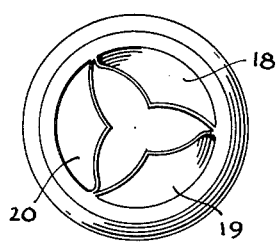
Figure 5 is a top plan view of the valve in open position.

While the operation of the valve illustrated in Figures 2 to 6, inclusive, is believed to be obvious from the description of the parts given it may be briefly outlined by noting that Figures 3 and 4 depict the valve in closed position. In this position the respective edges 26 and 27 meet in sealing relation and any return pressure of blood in the aorta artery 12 will be effective on the respective walls of the webs 18, 19 and 20 to force the edges into this sealing engagement.

When the heart builds up pressure on blood in the right ventricle 11 the latter is forced into the bore 14 of the casing 13. The pressure in the blood is effective to spread or expand the webs 18, 19, and 20 in the manner depicted in Figures 5 and 6 and thereby open the valve so that blood will pass from the right ventricle 11 into the aorta artery 12. On each pulse or throb of the heart, the valve is opened to permit of this passage of blood and is then closed to prevent the return of blood from the aorta artery back into the right ventricle.

Figure 7:
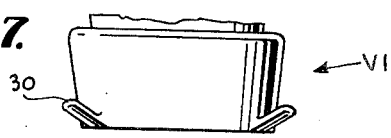
Figure 7 is a view in side elevation of a modification.
Figure 8:
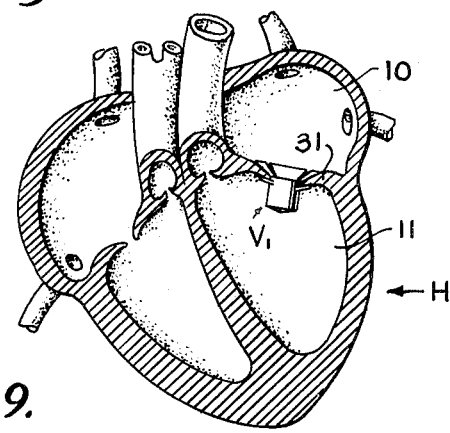
Figure 8 is a sectional view through the human heart, somewhat similar to Figure 1, and showing the valve of this invention as a mitral valve.
Figure 9:
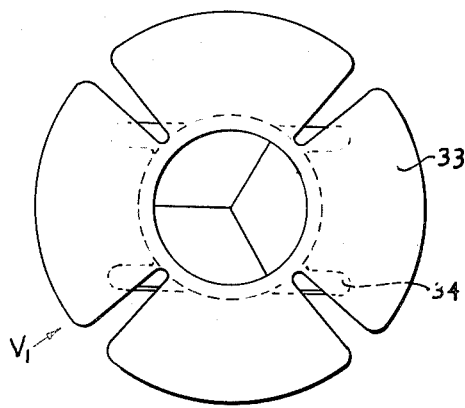
Figure 9 is a top-plan view of the mitral valve per se.
Figure 10:
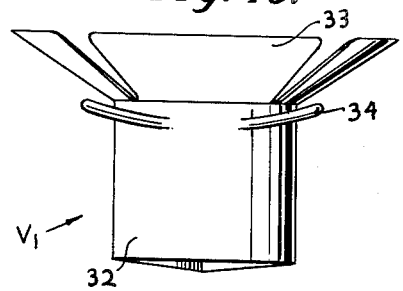
Figure 10 is a view in side elevation of the mitral valve.
Figure 11:
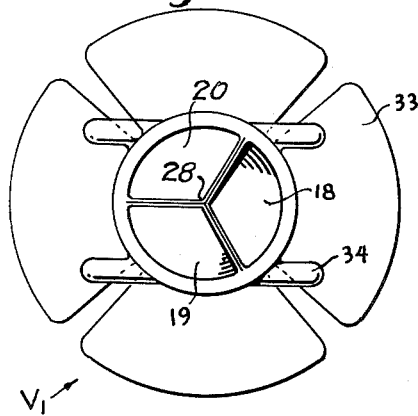
Figure 11 is a bottom-plan view of the mitral valve.
Figure 12:
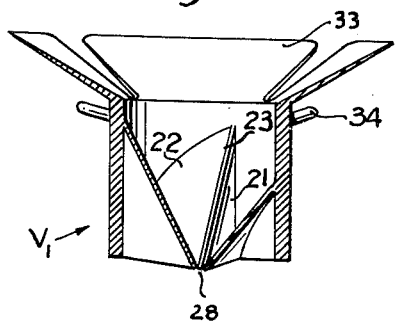
Figure 12 is a vertical section through the mitral valve.

A modified form of the valve is shown in Figure 7. In this view the valve is designated $V_1$. The valve $V_1$ is formed with a plurality of hooks 30 which extend outwardly from the lower end of the casing wall 13 and which are intended to function much in the manner of the flange 29 in securing the valve in position.

The mitral valve

Referring now more particularly to Figures 8 to 12 inclusive, the invention is therein illustrated when adapted for use as a mitral valve. Between the right auricle 10 and the right ventricle 11, there is a membrane or partition 31 which is formed with the natural mitral valve. When this mitral valve has deteriorated to the point where it no longer functions properly and must be replaced, the mitral valve of this invention, which is indicated at $V_1$, is inserted in the partition 31.

The valve $V_1$ comprises a casing 32 which corresponds to the casing 13 of the valve V and from which extend inwardly a plurality of webs which correspond to the webs 18, 19, and 20 of the valve V. The only essential difference between the arrangement of webs in the valve $V_1$, as compared to the valve V, is that in the valve $V_1$ the vertex 28 is located at the bottom rather than at the top. Blood is intended to flow downwardly through the valve $V_1$ into the right ventricle 11 and the webs are intended to close under the influence of any tendency to return so as to prevent such return.

In order to secure the valve $V_1$ in position, the casing 32 carries at its upper end a flange 33 which is segmental in character and gives an appearance similar to that of a clover leaf. This flange is intended to be located on the auricle side of the partition 31.

Spaced from the flange 33 are a plurality of lugs 34 which outstand from the casing 32. These lugs 34 engage the partition 31 on the ventricle side.

It is evident from the foregoing paragraph that the partition 31, about the mitral valve opening, is engaged between the clover leaf flange 33 on the one side, and the lugs 34 on the other, to secure the valve $V_1$ in position.

While preferred specific embodiments of the invention are hereinbefore set forth, it is to be clearly understood that the invention is not to be limited to the exact materials, constructions, and designs illustrated and described because various modifications of these details may be provided in putting the invention into practice within the purview of the appended claims.

What is claimed is:

1. In a valve adapted for insertion in a human heart, a valve casing made of a synthetic plastic and having a cylindrical bore, and a plurality of webs integrally joined to said casing and extending longitudinally into said bore in converging relation, each of said webs comprising a pair of walls integrally joined by a fold so that one of said walls is of a larger surface area than the other wall, said casing being formed with an annular groove intermediate its ends and a plurality of outwardly extending hooks at the end remote from the convergence of the webs.

2. In a valve adapted for insertion into a human heart, a substantially cylindrical casing made of a synthetic plastic having properties of resilience, flexibility, and elasticity, said casing being formed with a cylindrical bore, a plurality of webs integrally joined to said casing and extending into said bore in converging relation, each of said webs having a pair of walls in angular relation integrally joined by a fold so that one of said walls is of a larger surface area than the other wall, each of said walls having an end edge with the end edge of one wall of one web in sealing engagement with the other wall of another web, said edges converging toward a common vertex, said casing being formed with an annular groove intermediate its ends and a plurality of outwardly extending hooks at the end remote from the convergence of the webs.

3. In a valve adapted for insertion into a human heart as a mitral valve, a valve casing made of synthetic plastic and having a cylindrical bore, a plurality of webs integrally joined to said casing and extending longitudinally into said bore in converging relation, each of said webs comprising a pair of walls integrally joined by a fold so that one of said walls is of a larger surface area than the other wall, a flange extending outwardly from said casing at one end thereof, and a plurality of lugs outstanding from said casing in spaced relation with respect to said flange.

4. In a valve adapted for insertion into a human heart as a mitral valve, a valve casing made of synthetic plastic and having a cylindrical bore, a plurality of webs integrally joined to said casing and extending longitudinally into said bore in converging relation, each of said webs comprising a pair of walls integrally joined by a fold so that one of said walls is of a larger surface area than the other wall, a clover leaf-like flange extending outwardly from one end of said casing, said flange being of conical formation, and a plurality of lugs outstanding from said casing in spaced relation to said flange.

5. In a valve adapted for insertion in a human heart as a mitral valve, a valve casing made of a synthetic plastic and having a cylindrical bore, a plurality of webs integrally joined to said casing and extending longitudinally into said bore in converging relation, each of said webs comprising a pair of walls integrally joined by a fold so that one of said walls is of a larger surface area than the other wall with one of said walls being joined to the bore of said casing over a straight line and the other of said walls to said casing over a curved line, a conical segmental flange at one end of said casing, and a plurality of lugs outstanding from said casing in spaced relation to said flange.

6. In a valve adapted for insertion into a human heart, a valve casing made of a synthetic plastic and having a cylindrical bore therein, and a plurality of webs integrally joined to said casing and extending into said bore in converging relationship, each of said webs comprising a pair of walls integrally joined by a fold with one of said walls joined to said casing along a longitudinal straight line so as to lie in a plane parallel to the axis of said bore and the other wall joined to said casing over a curved line so as to lie in a plane in angular relationship with the axis of said bore.

7. In a valve adapted for insertion into a human heart, a valve casing made from a synthetic plastic and having a cylindrical bore therein, and a plurality of webs integrally joined to said casing and extending longitudinally into said bore in converging relationship, each of said webs comprising a pair of walls integrally joined by a fold so that one of said walls is of a larger surface area than the other wall.

8. In a valve adapted for insertion into a human heart, a cylindrical valve casing made from a flexible synthetic plastic and having a cylindrical bore therein, the outside of said casing being provided with a surface converging in opposed directions toward each end thereof from a point intermediate said ends and being provided with a circumferential groove separating the point of opposed convergence of said surface, and a plurality of flexible webs integrally joined to said casing and extending longitudinally into said bore in converging relationship, each of said webs comprising a pair of walls integrally joined by a fold so that one of said walls is of larger surface area than the other wall.

9. In a valve adapted for insertion into a human heart, a cylindrical valve casing made from a flexible synthetic plastic and having a cylindrical bore therein, the outside of said casing being provided with a surface converging in opposed directions toward each end thereof from a point intermediate said ends and being provided with a circumferential groove separating the point of opposed convergence of said surface, and a plurality of webs integrally joined to said casing and extending into said bore in converging relationship, each of said webs comprising a pair of walls integrally joined by a fold with one of said walls joined to said casing along a longitudinally straight line so as to lie in a plane parallel to the axis of said bore and the other wall joined to said casing over a curved line so as to lie in a plane in angular relationship with the axis of said bore.

10. In a valve adapted for insertion into a human heart, a valve casing made from a synthetic plastic and having a cylindrical bore therein, and a plurality of webs integrally joined to said casing and extending longitudinally into said bore in converging relationship, each of said webs comprising a pair of walls integrally joined by a fold so that one of said walls is of a larger surface area than the other wall, each of said walls having an end edge with the end edge of one wall of one web in sealing engagement with the other wall of another web, said edges converging toward a common vertex, said casing being formed with a circumferential groove intermediate its extremities and an outwardly extending flange at the end remote from the convergence of said webs.

References Cited in the file of this patent

UNITED STATES PATENTS

| Number | Name | Date |
|---|---|---|
| 15,192 | Peale | June 24, 1856 |
| 584,091 | Leidich | June 8, 1897 |

OTHER REFERENCES

W. D. Strand: "Cardiovascular Disease," 4th edition, published by F. A. Davis Co., Phila., Pa. (1950). (A copy is in the Army Medical Library, Wash., D. C., Article 28 by C. S. Beck, p. 834.)

Bulletin: American College of Surgeons, vol. 34, #1, Jan. 1949, p. 27, article entitled "The Correction of Aortic Insufficiency in Dogs with an Artificial Aortic Valve," by J. Moore Campbell. (A copy is in Div. 55.)

Life Magazine, April 9, 1951, pp. 105 and 106. (A copy is in Div. 55.)